United States Patent Office 3,162,108
Patented Dec. 22, 1964

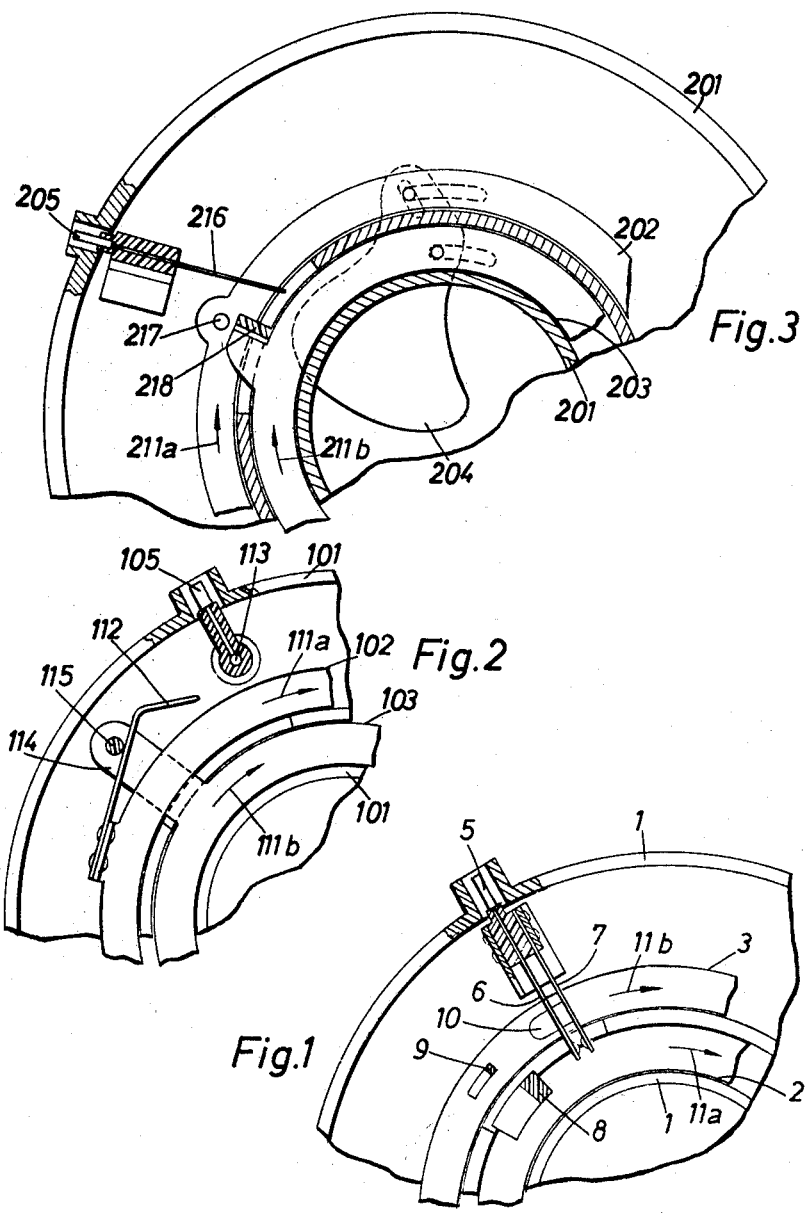

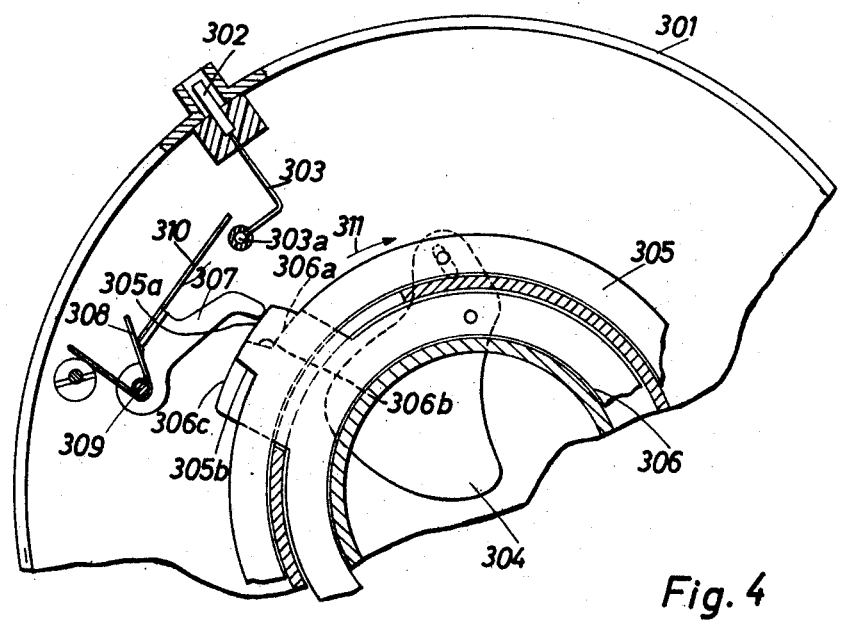

3,162,108
PHOTOGRAPHIC FLASH SYNCHRONIZING
ASSEMBLY
Roland Knorr, Gerd Kiper, and Ferdinand Fackler, all of Munich, Germany, assignors to Agfa Aktiengesellschaft, Leverkusen-Bayerwerke, Germany
Filed May 22, 1961, Ser. No. 111,805
Claims priority, application Germany, July 16, 1960,
A 15,303, A 15,304
2 Claims. (Cl. 95—11.5)

The present invention relates to cameras.

More particularly, the present invention relates to shutter assemblies of cameras which are adapted to make exposures with flash illumination.

In cameras of the above type, particularly where a between-the-lens shutter is used, a switch which closes the circuit of the flash-illumination assembly so as to effect ignition of the flash device is closed during operation of the shutter itself. For example, during opening of the shutter the shutter element which effects opening of the shutter will engage an element such as a spring-pressed lever to turn this latter lever which then will cause a switch to be closed for effecting the illumination of the flash, and thereafter the parts move away from the lever so that the switch will open. Conventional structures of this type suffer from the disadvantage of providing an unpredictable influence on the operation of the shutter which cannot be foreseen and which therefore results in inaccurate operation of the camera both with respect to the operation of the shutter itself as well as the synchronizing of the flash with the operation of the shutter. The reason for this is that the moving shutter elements suddenly encounter the resistance offered by such a spring-pressed lever or the like so that the manner in which the shutter elements operate suddenly changes and it thus becomes impossible to provide a predictable, precise type of shutter operation which will give the highest possible degree of accuracy and synchronization. The same is true of course when the shutter elements operate to close the shutter since the shutter elements will suddenly be released from the pressure applied by a spring-pressed lever or the like, and thus the movement of the parts suddenly changes since there is suddenly a lessening of the resistance to the movement of the parts, and this also results in inaccuracy of operation of the shutter. Moreover, with such conventional structures there is a considerable impact on the elements of the shutter when they engage a spring-pressed lever or the like for producing closing of the switch of the circuit of the flash assembly, and this impact not only operates undesirably to provide an unpredictable influence on the operation but in addition creates a considerable amount of wear and tear and a considerable amount of vibrations in the delicate elements of the shutter so that the life of the shutter is greatly reduced and the precision with which all of the parts cooperate with each other is diminished considerably.

One of the primary objects of the present invention is to provide a between-the-lens shutter assembly which is adapted to operate with flash illumination and which will effect closing and opening of the electrical circuit of the flash assembly without providing any change in the manner of movement of the shutter elements themselves so that the opening and closing of the circuit of the flash assembly will not have an unpredictable and an undesirable influence on the operation of the shutter and the greatest possible precision in the operation of the shutter and synchronization between shutter and flash operation can be maintained.

A further object of the present invention is to provide a structure of the above type which can be easily adjusted so as to provide desired relationship between the operating elements.

An additional object of the present invention is to provide in a between-the-lens shutter assembly of the type referred to above simple rugged elements which will operate reliably and which are of relatively low cost and occupy only a small amount of space.

It is furthermore an object of the present invention to provide a structure where the shutter structure itself participates in the provision of an electrical circuit for flash illumination and even carries elements of the switch itself, so that in this way a considerable amount of space is saved.

With the above objects in view, the invention includes, in a between-the-lens shutter assembly which is adapted to operate with flash illumination, a rotary opening-ring means for opening a shutter during turning of this opening-ring means through a predetermined angle. A rotary closing-ring means is provided for closing the shutter during turning of the closing-ring means through a given angle, and a switch-closing means is carried at least in part by the opening-ring means for turning movement therewith and for participating, substantially at the end of the turning of the opening-ring means through the above predetermined angle, in the closing of a switch for effecting flash illumination. This switch-closing means has a substantially constant influence on the turning of the opening-ring means through substantially all of the above predetermined angle, so that the manner in which the opening-ring means turns, is not changed by the switch-closing means. A switch-opening means is carried at least in part by the closing-ring means for turning movement therewith and participates, substantially at the end of the turning of the closing-ring means through the above given angle, in the opening of the switch of the circuit of the flash assembly, and this switch-opening means has also a substantially constant influence on the turning of the closing-ring means through substantially all of the above-mentioned given angle, so that the manner of turning of the closing-ring means is not changed by the switch-opening means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary partly sectional view of that part of a between-the-lens shutter assembly which is provided with the structure of the invention, FIG. 1 showing only enough structure to afford a complete understanding of the invention;

FIG. 2 is a fragmentary sectional elevational view of another embodiment of a between-the-lens shutter assembly which includes a structure according to the present invention;

FIG. 3 is a fragmentary sectional elevational view of still a third embodiment of a structure according to the present invention incorporated into a between-the-lens shutter asembly; and FIG. 4 shows yet another embodiment of a structure according to the present invention, FIG. 4 showing in a fragmentary sectional view a between-the-lens shutter assembly which includes the structure of the invention.

FIG. 1 fragmentarily illustrates the housing 1 of a between-the-lens shutter assembly, this assembly including in a well known manner a plurality of shutter blades which are adapted to turn with respect to each other so as to open and close the shutter, these blades extending across the central opening of the housing 1. The assembly includes an opening-ring means 2 in the form of an annular, circular ring whose center is in the optical axis, and the ring 2 is turned about the optical axis in a well known manner for producing opening of the shutter. Coaxial with the ring 2 is a closing-ring means 3 which is turned in a well known manner for producing closing of the shutter, the ring 3 also being circular and having its center in the optical axis. For example, the plurality of shutter blades may be pivotally connected to the ring 2 and may have a pin-and-slot connection to the ring 3 so that when the ring 2 turns in the direction of the arrow 11a of FIG. 1 with respect to the ring 3 the blades will turn with respect to each other so as to open the shutter, while when the ring 3 turns in the direction of the arrow 11b of FIG. 1 the blades turn so as to close the shutter, and when the shutter is closed in this manner the ring 3 will again have with respect to the ring 2 the angular position which it originally had. Thereupon, in a well known manner both of the rings 2 and 3 are returned to their starting position without being turned with respect to each other so that the shutter remains closed, and the strucure is then ready for the next exposure.

As may be seen from FIG. 1, the housing 1 carries an electrical switch means which includes the pair of electrically conductive springy switch blades 6 and 7 which are insulated from each other, and the switch means further includes the prong 5 which is adapted to be received in a plug of a flexible conductor connected in a well known manner to the prong 5 for providing the circuit to the flash apparatus which is carried by the camera. Such electrical connectors 5 are well known in the art. In the illustrated example the electrical connector 5 is connected with the blade 6. When the blade 6 is placed in electrical communication with the blade 7 as by being pushed toward the blade 7, for example, the circuit will be closed in a well known manner and the flash will be ignited.

The opening-ring means 2 carries at least part of a switch-closing means which turns with the opening-ring means 2 for closing the switch 6, 7 substantially at the end of the turning of the ring means 2 through a predetermined angle which will open the shutter fully, and this switch-closing means in the embodiment of FIG. 1 takes the form of a projection 8 made of an electrically non-conductive material and fixedly carried by the ring 2 for rotary movement therewith. The blade 6 is located in the path of turning of the projection 8 and is angularly spaced therefrom in the rest position of the part shown in FIG. 1 by an angular distance slightly less than the predetermined angle through which the ring 2 turns in order to open the shutter, and thus just before the ring 2 reaches the end of its turning movement for fully opening the shutter, the blade 6 will be moved by the switch-closing means 8 to a position engaging the blade 7, and thus the circuit will be closed and the flash will be ignited. Of course, the ring 2 is turned in the direction of the arrow 11a by an unillustrated spring which is tensioned during cocking of the shutter and to which the ring 2 is released upon release of the shutter in a well known manner. The closing-ring means 3 carries part of a switch-opening means, and this part of the switch-opening means is in the form of a projection 9 which is fixed to the ring 3 for rotary movement therewith and which is made of an electrically non-conductive material. The switch-opening means further includes a projection 10 which is fixed to the switch blade 7 and which extends to the left therefrom without contacting the blade 6. The projection 10 remains at all times spaced from the blade 6, but the left end of the projection 10, as viewed in FIG. 1, is located in the path of turning of the projection 9 and is engaged and moved by the projection 9 just before the ring 3 reaches the end of the angle through which it turns in order to close the shutter, and thus just before the shutter is closed the element 9 will engage the projection 10 to move the blade 7 away from the blade 6 so as to open the switch means and thus open the circuit of the flash assembly. Of course, the ring 3 is also turned in the direction of the arrow 11b by an unillustrated spring, and the manner in which these rings 2 and 3 operate is purely conventional and well known in the art. During cocking of the shutter the rings 2 and 3 are moved as a unit in directions opposite to those indicated by the arrows 11a and 11b back to their starting positions shown in FIG. 1, and because the rings 2 and 3 move together at this time without turning one relative to the other the projections 8 and 9 do not again move into engagement with the switch elements 6 and 7, so that it remains open.

In the embodiment of the invention which is illustrated in FIG. 2, the opening-ring means 102 has a diameter greater than the closing-ring means 103. In this embodiment the opening-ring means 102 is turned in the same way as the ring 2, and the closing-ring means 103 is turned in the same way as the ring 3, the turning of the ring 102 in the direction of the arrow 111a through a predetermined angle producing opening of the shutter in a well known manner, while the turning of the ring 103 in the direction of the arrow 111b through a given angle produces closing of the shutter in a well known manner, and thereafter both of the rings are returned to their starting position in a direction opposite to that indicated by the arrows 111a and 111b, and during the cocking of the shutter when the rings 102 and 103 are returned they do not turn one relative to the other. With the embodiment of FIG. 2 the opening-ring means 102 also carries a switch-closing means for rotary movement therewith, and in this embodiment the switch-closing means takes the form of a springy switch blade element 112 which is fixed directly to the ring 102 for turning movement therewith and which is grounded through the ring 102. The switch means of this embodiment includes a contact pin 113 which is insulated in the manner shown in FIG. 2 and which is connected electrically with the connector 105 to which the remainder of the circuit of the flash apparatus is connected in a well known manner. The contact pin 113 is located in the path of turning of the switch element 112 to be engaged by the latter just before the ring 102 reaches the end of its turning movement in the direction of the arrow 111a, so that in this way the circuit for igniting the flash will be closed just before the ring 102 reaches the end of its turning movement. The ring 103 carries a switch-opening means, and for this purpose the ring 103 is provided with a projection 114 extending radially from the ring 103 beyond, without engaging, the ring 102, and adjacent its outer free end the projection 114 carries an electrically non-conductive pin 115 which is thus fixed to the ring 103 for rotary movement therewith. Just before the ring 103 reaches the end of its movement for closing the shutter the pin 115 engages the switch element 112 and moves it radially toward the optical axis away from the contact 113, so that in this way the switch is opened just before the closing-ring means reaches the end of its turning movement. As is indicated in FIG. 2, the structure is carried by a conventional shutter housing 101 which provides the supports which support the various elements for rotary movement. Inasmuch as the rings 102 and 103 turn as a unit back to their starting position during cocking of the shutter, the elements 112 and 113 will not engage each other at this time and thus the switch remains open during cocking of the shutter.

In the embodiment of the invention which is illustrated in FIG. 3 the switch means includes the springy contact blade 216 which is insulated from and carried by the shutter housing 201, the blade 216 being electrically connected with the connector 205. The housing 201 supports for rotary movement the opening-ring means 202 which turns in the direction of the arrow 211a for opening the shutter, and the housing 201 also supports for rotary movement the closing-ring means 203 which turns in the direction of the arrow 211b for closing the shutter. As is shown in FIG. 3, each of the shutter blades 204, only one of which is illustrated for the sake of clarity, has a pin-and-slot connection with the ring 202 and a pivotal connection with the ring 203 so that in this way when the ring 202 turns with respect to the ring 203 the blades 204 will turn away from the optical axis and will open the shutter, while when the ring 203 turns with respect to the ring 202 the blades will return to their position closing the shutter. The blades of the embodiments of FIGS. 1 and 2 are substantially identical with the blade 204 of FIG. 3 and cooperate in the same way as the rings of the embodiments of FIGS. 1 and 2.

With the embodiment of FIG. 3 the opening-ring means 202 carries a switch-closing means formed by an electrical contact pin 217 which is grounded by its connection with the ring 202, and in the cocked position of the shutter elements the springy blade 216 of the switch is angularly spaced from the pin 217 by a distance which is slightly less than the distance through which the ring 202 must turn in order to open the shutter, so that just before the ring 202 reaches the end of its turning movement the pin 217 will engage the pin 216 to close the switch and thus close the circuit of the flash apparatus to ignite the flash and effect flash illumination. Thereafter the closing-ring means 203 will turn, and with the embodiment of FIG. 3 it is the closing-ring means 203 which carries a projection 218 made of an electrical non-conductive material, and the switch blade 216 is located in the path of turning of the projection 218 and is angularly spaced therefrom in the cocked position illustrated in FIG. 3 by a distance which again is just slightly less than the distance through which the ring 203 turns in order to effect closing of the shutter, and thus just before the ring 203 stops turning the projection 218 will engage the blade 216 to move it away from the pin 217 and thus open the circuit and stop the energizing of the flash apparatus. Here also both of the rings 202 and 203 are returned to their starting position during cocking of the shutter without any turning movement of one of the rings with respect to the other, so that the switch 216, 217 will remain open during cocking of the shutter.

It will be noted that with all of the above-described embodiments of the invention during substantially all of the turning movement of the opening-ring means and closing-ring means the switch-closing and switch-opening structures have a constant influence on the turning of all of the ring means so that the manner in which the several ring means turn remains entirely uninfluenced throughout substantially all of the turning movement of the ring and thus the greatest possible precision of operation and synchronization can be maintained. For example, in the embodiment of FIG. 1 it will be seen that the element 8 simply remains connected to the ring 2 so as to turn therewith and this condition does not change until just before the very end of the turning of the ring 2 when the element 8 engages the blade 6. The same is true of the projection 9 and the ring 3, these elements maintaining the same relation with respect to each other during substantially the entire turning of the ring 3, so that the switch-opening means certainly has no influence on the turning of the shutter closing ring 3. Also, with the embodiment of FIG. 2 it will be seen that the element 112 simply remains connected to the ring 102 and turns therewith without being able to produce any change in the manner of the turning of the ring 102, and this is true until just before the end of the turning of the ring 102 when the element 112 engages the contact 113, and even at this extremely short time just before the end of the turning of the ring 102 there will be practically no influence whatsoever on the manner of the turning of the ring 102. It will be seen that the same holds true for the element 115 which maintains with respect to the ring 103 an unchanging relationship during almost the entire turning movement of the ring 103. Of course, the same holds true for the embodiment of FIG. 3 where the elements 217 and 218 will maintain with respect to the rings 202 and 203 an unchanging relationship during substantially the entire turning of these rings 202 and 203.

Substantially the same results are obtained with the embodiment of FIG. 4 which includes a switch-operating lever means 307. This switch-operating lever means 307 is turnably supported by a stationary pin 309 which is carried by the shutter housing 301, and a spring 308 is coiled about the pin 309, presses with one end against a stationary part carried by the housing 301 and with its opposite end against a lug of the lever 307 so as to urge the latter to turn in a clockwise direction, as viewed in FIG. 4.

The between-the-lens shutter assembly of FIG. 4 includes in addition to the shutter housing 301 the opening-ring means 305 and the closing-ring means 306 which are substantially identical with the opening-ring means and closing-ring means of the embodiments described above. As is apparent from FIG. 4, the shutter blades 304, one of which is shown in FIG. 4, have a pin-and-slot connection with the opening-ring means 305 and a pivotal connection with the closing-ring means 306. With this embodiment the opening-ring means 305 has a radial projection at its periphery, and this radial projection has an outer peripheral edge 305a engaged by the tip of the lever 307 and also the projection has an end edge 305b. The closing-ring means 306 also has a radial projection extending from its periphery, and this radial projection first extends out to a radial distance from the optical axis equal to the outer periphery of the ring 305, and at this point the stepped projection of the ring 306 has an edge portion 306a. The projection of the ring 306 then extends to a farther radial distance from the optical axis and has an edge 306b extending outwardly beyond the edge 306a and connected to the outermost edge 306c which is at the same radial distance from the optical axis as the edge 305a, and the width or thickness of the portion of the lever 307 which engages the projections of the rings 305 and 306 is such that this portion or tip of the lever 307 occupies the planes which are occupied by both of the rings 305 and 306 so that the lever 307 will cooperate with the projections of both of the rings 305 and 306.

The switch structure which is carried by the shutter housing 301 includes the connector 302 which is insulated as shown in FIG. 4 and which is connected through a conductor 303 with a stationary contact pin 303a which is also insulated as shown, and the lever 307 itself carries the switch contact blade 310 which by engagement with the contact pin 303a will close the circuit. During its shutter-opening movement the opening-ring means 305 turns in the direction of the arrow 311.

As is apparent from FIG. 4, in the cocked position of the shutter the switch-operating lever means 307 engages the edge 305a of the projection of the opening-ring means 305. In this position the switch blade 310 is maintained spaced from the contact pin 303a, so that the switch is open and of course the electrical circuit is open. When the operator releases the shutter for operation an unillustrated spring will in a conventional manner turn the ring 305 in the direction of the arrow 311, and just before the ring 305 reaches the end of its shutter-opening movement the lever 307 will engage and slide along the edge 305b so that the contact 303a will be engaged by the springy switch blade 310 and the circuit will be closed to effect illumination by the flash apparatus. Now the ring 306 turns in the direction of the arrow 311 so as to provide closing of the shutter, and now the edge 306a will slide along the lever 307 and immediately thereafter the edge 306b so that the lever 307 returns to the position illustrated in FIG. 4 moving the contact 310 away from the contact 303a so as to open the switch and open the circuit, the lever 307 slidably engaging the edge 306c after moving out of engagement with the edge 306b. Thus, with this embodiment the switch 303a, 310 will be opened immediately after it is closed and a repeated closing of the switch and energizing of the flash apparatus will be reliably avoided. During cocking of the shutter both of the rings 305 and 306 will turn as a unit so that the edge 305a engages the lever 307 immediately after and for a time simultaneously with the edge 306c so that the lever 307 is maintained in the position shown in FIG. 4 during cocking of the shutter, and closing of the switch during cocking of the shutter is reliably prevented in this way.

It will be noted that with the embodiment of FIG. 4 the spring 308 maintains lever 307 at all times in engagement with the projections of one or the other of the rings 305 and 306, and thus there is a constant sliding engagement between the rings 305 and 306 and the lever 307, so that the load or resistance to turning of the rings 305 and 306 provided by the lever 307 remains substantially constant and does not change and thus with this embodiment also the switch-closing and switch-opening means will maintain a constant influence on the turning of the rings 305 and 306 so that there are no impacts or other factors which will undesirably influence the operation in an unpredictable manner and thus with the embodiment of FIG. 4 there will also be a great precision and synchronization. It will be seen that the structure of the invention can be used with X-synchronization without requiring any special additions, and the adjustment of the structure for this purpose can be carried out very easily.

It will be understood that each of the elements described above, or two or more together, may also find a useful application in other types of cameras differing from the types described above.

While the invention has been illustrated and described as embodied in camera shutter assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a between-the-lens shutter assembly which is adapted to operate with flash illumination, in combination, switch means for providing flash illumination when said switch means is closed, said switch means having a pair of switch blades which close a circuit when said switch blades contact each other; rotary opening-ring means for opening a shutter during turning of said opening-ring means through a predetermined angle; an electrically non-conductive projection carried by said opening-ring means for turning movement therewith, one of said blades of said switch means being located in the path of turning movement of said projection to be engaged thereby and moved toward the other of said blades for closing said circuit, said one blade being positioned with respect to said projection to be engaged thereby substantially at the end of the turning of said opening-ring means through said predetermined angle; a second projection carried by the other of said blades of said switch means; closing-ring means turnable through a given angle for closing the shutter; and a third projection which is electrically non-conductive and which is carried by said closing-ring means for turning movement therewith through said given angle, said second projection being located in the path of turning of said third projection and being positioned to be engaged by said third projection substantially at the end of the turning of said closing-ring means through said given angle so that the movement of said second projection by said third projection will move said other blade away from said one blade to open said circuit.

2. In a between-the-lens shutter assembly which is adapted to operate with flash illumination, in combination, a pair of contact means forming a switch for providing flash illumination when said switch is closed upon engagement of said pair of contact means with each other; rotary opening-ring means for opening a shutter during turning of said opening-ring means through a predetermined angle; a projection carried by said opening-ring means for turning movement therewith, one of said pair of contact means being located in the path of turning movement of said projection to be engaged thereby and moved toward the other of said pair of contact means into engagement therewith for closing said switch, said one contact means being positioned with respect to said projection to be engaged thereby substantially at the end of the turning of said opening-ring means through said predetermined angle; closing-ring means turnable through a given angle for closing the shutter; and a second projection carried by said closing-ring means for turning movement therewith through said given angle, said other contact means being located in the path of turning of said second projection and being positioned to be engaged by said second projection substantially at the end of the turning of said closing-ring means through said given angle so that movement of said other of said pair of contact means by said second projection will move said other contact means away from said one contact means to open said switch.

References Cited by the Examiner
UNITED STATES PATENTS

| | | | |
|---|---|---|---|
| 2,890,640 | 6/59 | Noack | 95—63 |
| 2,960,922 | 11/60 | Takahama | 95—11.5 |

NORTON ANSHER, *Primary Examiner.*

JOHN M. HORAN, *Examiner.*